United States Patent
Park et al.

(10) Patent No.: US 9,517,949 B2
(45) Date of Patent: Dec. 13, 2016

(54) WATER TREATMENT APPARATUS WITH CIRCULATING FLOW PATH AND WATER TREATMENT METHOD USING THE SAME

(71) Applicant: LG ELECTRONICS INC., Seoul (KR)

(72) Inventors: Rayoung Park, Changwon-si (KR); Yongjoo Yi, Changwon-si (KR); Woong Choi, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 632 days.

(21) Appl. No.: 13/943,696

(22) Filed: Jul. 16, 2013

(65) Prior Publication Data

US 2014/0021132 A1 Jan. 23, 2014

(30) Foreign Application Priority Data

Jul. 17, 2012 (KR) .......... 10-2012-0077928

(51) Int. Cl.

| | | |
|---|---|---|
| *B01D 61/14* | (2006.01) | |
| *B01D 61/16* | (2006.01) | |
| *B01D 61/18* | (2006.01) | |
| *B01D 61/20* | (2006.01) | |
| *B01D 61/22* | (2006.01) | |

(Continued)

(52) U.S. Cl.
CPC .............. *C02F 1/44* (2013.01); *B01D 61/145* (2013.01); *B01D 61/147* (2013.01); *B01D 61/16* (2013.01);

(Continued)

(58) Field of Classification Search
CPC ......... B01D 37/04; B01D 61/04; B01D 61/12; B01D 61/16; B01D 61/22; B01D 2311/04; B01D 2311/12; B01D 2311/16; B01D 2311/24; B01D 2311/246; B01D 2311/25; B01D 2311/2642; B01D 2313/19; B01D 21/0039; B01D 21/0042; B01D 21/0045; B01D 21/0048; B01D 21/01; B01D 21/0024; B01D 21/2444; B01D 61/14; B01D 61/145; B01D 61/147; B01D 61/18; B01D 61/20; B01D 2313/08; B01D 2313/18; B01D 2313/243; C02F 1/008; C02F 1/44; C02F 1/441; C02F 1/442; C02F 1/444; C02F 1/52; C02F 1/5209; C02F 1/5281; C02F 2209/003; C02F 2209/10; C02F 2209/11; C02F 2209/40; C02F 2209/44; C02F 2301/046; C02F 2301/02

(Continued)

(56) References Cited

U.S. PATENT DOCUMENTS

| | | | | |
|---|---|---|---|---|
| 2,502,349 A | * | 3/1950 | Sebald ............. | C02F 1/685 210/127 |
| 5,043,072 A | * | 8/1991 | Hitotsuyanagi ...... | B01D 61/16 210/638 |

(Continued)

FOREIGN PATENT DOCUMENTS

| | | |
|---|---|---|
| CN | 102424495 A | 4/2012 |
| CN | 102515395 A | 6/2012 |

(Continued)

*Primary Examiner* — Joseph Drodge
(74) *Attorney, Agent, or Firm* — Birch, Stewart, Kolasch & Birch, LLP

(57) ABSTRACT

A water treatment apparatus and a water treatment method using the same are provided. The water treatment apparatus includes a cohesive agent input device configured to input a cohesive agent to raw water, a membrane filtering device, a raw water pump configured to transfer raw water including the cohesive agent therein to the membrane filtering device, a water supply flow path connecting a discharge side of the raw water pump to the inlet of the membrane filtering device, a circulation flow path connecting the raw water discharge opening of the membrane filtering device to the water supply flow path and a circulation pump provided in the circulation flow path to transfer discharged raw water to the water supply flow path.

18 Claims, 3 Drawing Sheets

(51) Int. Cl.
*C02F 1/44* (2006.01)
*C02F 1/52* (2006.01)

(52) U.S. Cl.
CPC ............... *B01D 61/22* (2013.01); *C02F 1/444* (2013.01); *C02F 1/5209* (2013.01); *B01D 2311/04* (2013.01); *B01D 2311/25* (2013.01); *B01D 2311/2642* (2013.01); *C02F 1/5281* (2013.01); *C02F 2209/001* (2013.01); *C02F 2209/11* (2013.01); *C02F 2209/40* (2013.01); *C02F 2301/02* (2013.01); *C02F 2301/046* (2013.01)

(58) Field of Classification Search
USPC ..... 210/96.2, 138, 194, 195.2, 198.1, 257.2, 210/321.6, 639, 650, 739, 702, 805
See application file for complete search history.

(56) References Cited

U.S. PATENT DOCUMENTS

| | | | | |
|---|---|---|---|---|
| 6,103,125 A | * | 8/2000 | Kuepper | B01D 61/025 210/137 |
| 6,241,892 B1 | * | 6/2001 | Whitworth | B01D 61/022 204/518 |
| 6,413,417 B1 | * | 7/2002 | Yamasaki | C02F 1/5245 210/151 |
| 8,518,261 B2 | * | 8/2013 | Lee | B01D 61/147 210/636 |
| 2007/0175804 A1 | * | 8/2007 | Kosanda | B01D 21/0012 210/85 |
| 2015/0027890 A1 | * | 1/2015 | Jha | B01J 39/043 204/520 |

FOREIGN PATENT DOCUMENTS

| | | |
|---|---|---|
| EP | 0421399 A1 | 4/1991 |
| JP | 10180008 A | 7/1998 |
| JP | 11-19696 A | 1/1999 |
| JP | 2001239264 A | 9/2001 |
| JP | 2001-286872 A | 10/2001 |
| JP | 2001-286882 A | 10/2001 |
| JP | 2009-226285 A | 10/2009 |
| KR | 1020100125930 A | 12/2010 |

* cited by examiner

WATER TREATMENT APPARATUS WITH CIRCULATING FLOW PATH AND WATER TREATMENT METHOD USING THE SAME

CROSS-REFERENCE TO RELATED APPLICATION

Pursuant to 35 U.S.C. §119(a), this application claims the benefit of earlier filing date and right of priority to Korean Application No. 10-2012-0077928, filed on Jul. 17, 2012, the contents of which is incorporated by reference herein in its entirety.

BACKGROUND OF THE INVENTION

Field of the Invention

The present disclosure relates to a water treatment apparatus and a water treatment method using the same, and particularly, to a water treatment apparatus and method for clumping foreign materials included in raw water.

Description of Related Art

In general, a physical, chemical water treatment method includes a clumping-precipitating-filtering process, a clumping-floating-filtering process, or the like, and here, the clumping process is a process of growing fine colloid particles floating in raw water to flocs, a grain having a size sufficient for precipitation and filtering. In the clumping process, a cohesive agent for promoting colloid particles to be clumped into flocs is applied to raw water, and a blending process is performed to allow the cohesive agent to be evenly mixed with the raw water. The blending process requires a flocculator including an impeller provided therein. In addition, raw water including flocs of foreign materials in the flocculator is transferred to a membrane filtering device by a pump.

In the water treatment method as described above, a degree of clumping of foreign materials in raw water significantly affects filtering efficiency of the membrane filtering device. Namely, as higher degrees of clumping are obtained, a usage mount of cohesive agent and a recovery rate of raw water in the membrane filtering device can be increased. However, although flocs are grown sufficiently in the flocculator or a settling tank, a recovery rate in the membrane filtering device may not be satisfactory in certain situations. In order to solve this problem, a method of increasing a usage amount of cohesive agent may be considered; however, this leads to an increase in cost.

In addition, since additional facilities such as a mixing tank, a flocculator, or a settling tank are required, an installation place is restricted and cost for construction is increased.

BRIEF SUMMARY OF THE INVENTION

Therefore, an aspect of the detailed description is to provide a water treatment apparatus and method capable of enhancing filtering efficiency of a membrane filtering device without increasing a usage amount of a cohesive agent.

Another aspect of the detailed description is to provide a water treatment apparatus and method capable of generating flocs having an intended particle diameter without the need for a mixing tank, a flocculator, or a settling tank.

To achieve these and other advantages and in accordance with the purpose of this specification, as embodied and broadly described herein, a water treatment apparatus includes: a cohesive agent input device configured to input a cohesive agent to raw water; a membrane filtering device including an inlet allowing raw water including a cohesive agent therein to be introduce therethrough, a water treatment discharge opening configured to discharge treatment water, and a raw water discharge opening allowing a partial amount of unfiltered raw water to be discharged therethrough; a raw water pump configured to transfer raw water including a cohesive agent to the membrane filtering device; a water supply flow path connecting a discharge side of the raw water pump and the inlet of the membrane filtering device; a circulation flow path connecting the raw water discharge opening of the membrane filtering device and the water supply flow path; and a circulation pump provided in the circulation flow path to transfer discharged raw water to the inlet.

In the aspect of the present invention, a flocculator and a settling tank used in an existing water treatment apparatus are omitted and the circulation flow path for collecting a partial amount of raw water from the membrane filtering device and resupplying it to the membrane filtering device is provided so that clumping is made in the process in which raw water flows along the circulation flow path.

The inventors of the present invention, upon recognizing that, while flocs having a sufficient size are formed by inputting a cohesive agent, flocs are broken due to a mechanical collision within a pump in the process of being transferred by the pump thereby degrading filtering efficiency. Instead, flocs are controlled to be grown in a lower stream side of the pump, rather than in a flocculator or a settling tank. Namely, as generated flocs collide with an impeller or a blade which rotates at a high speed within the pump, flocs are broken and the broken flocs are discharged to the outside, rather than being filtered out by the membrane filtering device, thereby degrading filtering efficiency and a degree of contamination of treatment water. However, since raw water is clumped, while being circulated in a low stream side of the pump, degradation of efficiency of the membrane filtering device can be prevented.

To achieve these and other advantages and in accordance with the purpose of this specification, as embodied and broadly described herein, a water treatment method includes: applying a cohesive agent to raw water; supplying raw water including a cohesive agent to a pump; supplying raw water discharged from the pump to a membrane filtering device; extracting a partial amount of raw water not filtered by the membrane filtering device; and re-supplying extracted raw water to a discharge side flow path of the pump.

Accordingly, exemplary embodiments of the present invention having the foregoing configuration, since clumping is made in a lower stream side of the pump, generated flocs are maintained to have an initial size, rather than being broken, filtering efficiency of the membrane filtering device can be enhanced without increasing a usage amount of cohesive agent.

In addition, since a flocculator or a settling tank is omitted or a size thereof is reduced, relative to an existing water treatment apparatus having the same processing capacity, restrictions due to an installation place can be reduced and costs required for construction thereof can also be reduced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

Hereinafter, a water treatment apparatus according to exemplary embodiments of the present invention will be described in detail with reference to the accompanying drawings.

Figure 1:
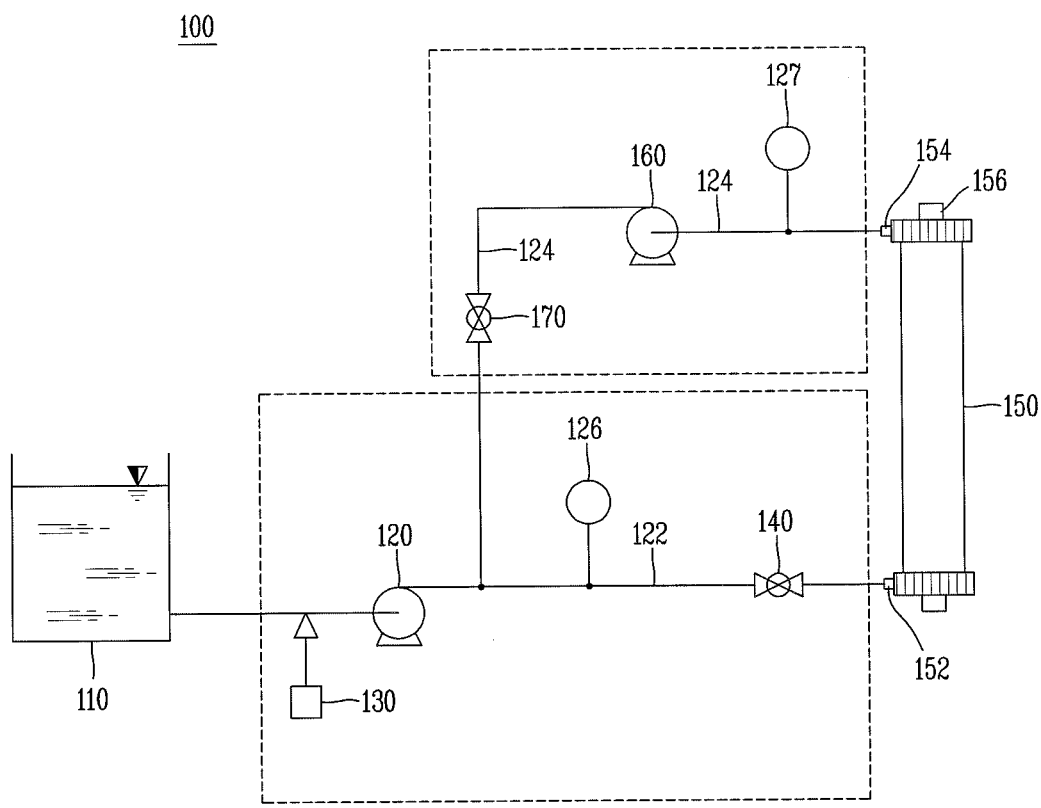
FIG. 1 is a view schematically illustrating a water treatment apparatus according to a first exemplary embodiment of the present invention.

FIG. 1 is a view schematically illustrating a water treatment apparatus according to a first exemplary embodiment of the present invention. Referring to FIG. 1, the water treatment apparatus 100 according to a first exemplary embodiment of the present invention includes a raw water tank 110 temporarily storing raw water as a treatment target, and raw water stored in the raw water tank 110 is introduced to a raw water pump 120.

Meanwhile, a cohesive agent input device 130 is positioned in an upper stream side of the raw water pump 120. Thus, in a state in which a cohesive agent is input (or applied) to raw water, the raw water is introduced to the raw water pump 120. The cohesive agent input to the raw water is pressurized within the raw water pump 120 and discharged to the outside, and in this process, the cohesive agent is evenly mixed with the raw water. This process may replace the related art fast mixing (or blending) process, and mixing may be performed by making raw water introduced to the raw water pump without installation of a mixing tank.

When mixing is performed in the raw water pump 120, colloid particles included in raw water clump together to form floc. The raw water including floc formed therein is discharged to a water supply flow path 122 connecting a discharge side of the raw water pump 120 and an inlet 152 of the membrane filtering device 150.

Figure 2:
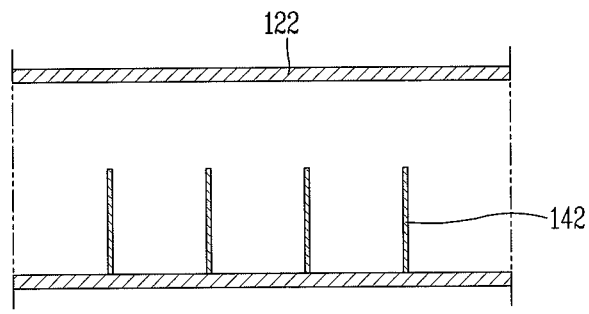
FIG. 2 is a cross-sectional view illustrating the interior of a water supply flow path of the water treatment apparatus according to the first exemplary embodiment illustrated in FIG. 1.
Figure 3:
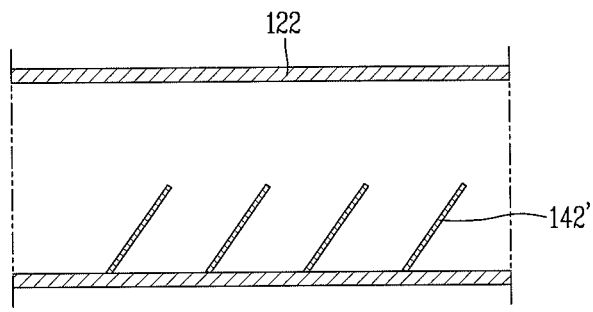
FIG. 3 is a cross-sectional view illustrating the interior of a modification of the water supply flow path of the water treatment apparatus according to the first exemplary embodiment illustrated in FIG. 1.

As illustrated in FIG. 2, a plurality of baffles 142 is installed within the water supply flow path 122. The baffles 142 increase flow resistance within the water supply flow path 122 to lower a flow rate of raw water, and thus, while the raw water is passing through the water supply flow path 122, a time for floc to grow can be lengthened. In detail, the baffles 142 illustrated in FIG. 2 are formed to extend as being perpendicular to an inner wall surface of the water supply flow path 122, but the present invention is not necessarily limited thereto and an example in which baffles 142' are slanted in a direction in which raw water flows may also be taken into consideration (See FIG. 3).

Also, the baffles 142 do not necessarily exist only in the water supply flow path 122, and if necessary, the baffles 142 may be provided on a circulation flow path 124. In addition, the number of the baffles is not limited to four as illustrated, but a certain number of baffles may be formed.

In addition, a first valve 140 for adjusting an opening degree is installed in the water supply flow path 122 so a flow rate of raw water may be adjusted together with the baffles. Namely, if a size of floc passing through the water supply flow path is not a desired size, a flow rate of raw water may be adjusted by using the first valve 140 to adjust a size of the floc. Here, a first pressure sensing unit 126 is installed in the water supply flow path 122, and a flow rate of raw water within the water supply flow path 122 measured by the first pressure sensing unit 126. The measured flow rate is used for adjusting an opening degree of the first valve 140 as described above.

Raw water including grown floc is introduced to the membrane filtering device 150 due to pressure of the raw water pump 120. The membrane filtering device may filter out floc mixed in raw water by using a membrane such as an ultrafilter membrane (UF), a microfilter membrane (MF), or the like. The treatment water without floc is discharged to the outside through a treatment water discharge opening 156, and flocs remaining in the membrane are removed from the membrane filtering device through a back washing process.

Meanwhile, the membrane filtering device further includes a raw water discharge opening 154 for allowing a partial amount of raw water, which has not passed through the membrane, to be discharged to the outside. Because raw water discharged from the raw water discharge opening 154 has not subjected to the filtering process through the membrane, it includes flocs mixed therein. The discharged raw water is introduced to the circulation flow path 124.

The circulation flow path 124 is formed to re-supply raw water discharged from the membrane filtering device to a lower stream side of the raw water pump 120, and includes a circulation pump 160 for transferring raw water discharged midway. As the circulation pump 160, a positive displacement pump, rather than a centrifugal pump in which an impeller or a vane is rotated, is employed. Through this, breaking of flocs mixed in raw water through the pump can be minimized. The circulation flow path 124 includes a second pressure sensing unit 127 for measuring a flow rate within the circulation flow path, and in addition, a second valve 170 for controlling a flow rate within the circulation flow path according to the flow rate measured by the second pressure sensing unit 127 is installed.

Meanwhile, although not shown, a turbidity measurement unit for measuring a degree of contamination, specifically, turbidity, of raw water introduced from the raw water tank 110 is provided in an upper stream of the cohesive agent input device 130. Through this, a degree of contamination of raw water to be processed (or treated) is checked in advance, and an amount of a cohesive agent to be applied thereto is adjusted.

Figure 4:
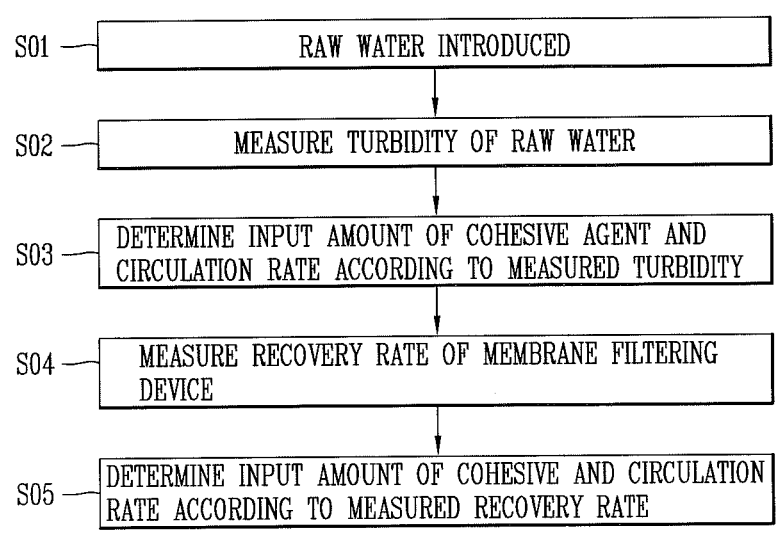
FIG. 4 is a flow chart illustrating a process of processing raw water in the water treatment apparatus according to the first exemplary embodiment illustrated in FIG. 1.

Hereinafter, a process of processing raw water according to the first exemplary embodiment of the present invention will be described with reference to FIG. 4.

First, the raw water pump 120 is operated to allow raw water within the raw water tank 110 to be introduced into the raw water pump 120 (step S01). In this process, turbidity of the introduced raw is measured by using the foregoing turbidity measurement unit (step S02), and an amount of applied cohesive agent is adjusted according to the measured turbidity (step S03). Here, the amount of cohesive agent may be adjusted to be proportional to the turbidity of raw water, or a turbidity section of raw water may be divided into certain sections, e.g., a low turbidity section, a middle turbidity section, and a high turbidity section, and input amounts of cohesive agent corresponding to the sections may be determined in advance, so that a cohesive agent is input accordingly.

Also, a circulation rate of raw water through the foregoing circulation flow path may be determined according to turbidity of raw water. Namely, as a degree of contamination is higher, an input amount of cohesive agent is increased, and accordingly, a time required for contamination materials included in the raw water to become flocs is also increased. Thus, a circulation rate is differently determined according to a degree of contamination.

Here, the circulation rate may be adjusted through various methods. For example, a method of adjusting an opening degree of the second control valve may be considered. In detail, since flow resistance varies according to the opening degree of the second control valve, a flow rate within the circulation flow path differs accordingly. Thus, in a case in which turbidity is high, an opening degree of the second control valve is increased to increase a circulation rate, and in a case in which turbidity is low, an opening degree of the second control valve is decreased to reduce a circulation rate. Also, since a time duration in which raw water remains in the circulation flow path is increased according to an opening degree of the second valve, so a time for flocs to grow can be increased accordingly. The method for controlling the second control valve may also be applied to the first control valve. Namely, a circulation rate may be adjusted to have a greater range by controlling the first and second control valves together. According to circumstances, only the first control valve may be controlled.

Besides, a method for changing an operation speed of the circulation pump may also be considered. Based on measured turbidity, for example, if the turbidity is high, an operation speed of the circulation pump may be increased to increase a circulation rate so that an amount of raw water extracted from the membrane filtering device can be increased. Conversely, if the turbidity is low, an operation speed of the circulation pump may be lowered to reduce an amount of extracted raw water.

According to circumstances, an amount of treatment water discharged from the membrane filtering device may be maintained by more than a predetermined range. Namely, in order to stably use treatment water extracted from the water treatment apparatus according to the first exemplary embodiment of the present invention, the treatment water by more than a predetermined amount is required to be continuously supplied. An amount of extracted treatment water in comparison with the supply of raw water may be defined as a recovery rate, and such a recovery rate is required to be controlled together with the circulation rate.

A recovery rate can be adjusted to a desired level by controlling the first and second control valves, the raw water pump, and the circulation pump. Namely, in a state in which a circulation rate is determined, a recovery rate is measured (step S04), and when the measured recovery rate is lower than a pre-set level, an operation speed of the circulation pump may be changed to increase the supply of raw water to thus increase the recovery rate. In this case, in order to increase filtering efficiency of the membrane filtering device, an input of a cohesive agent is temporarily increased (step S05).

Figure 5:
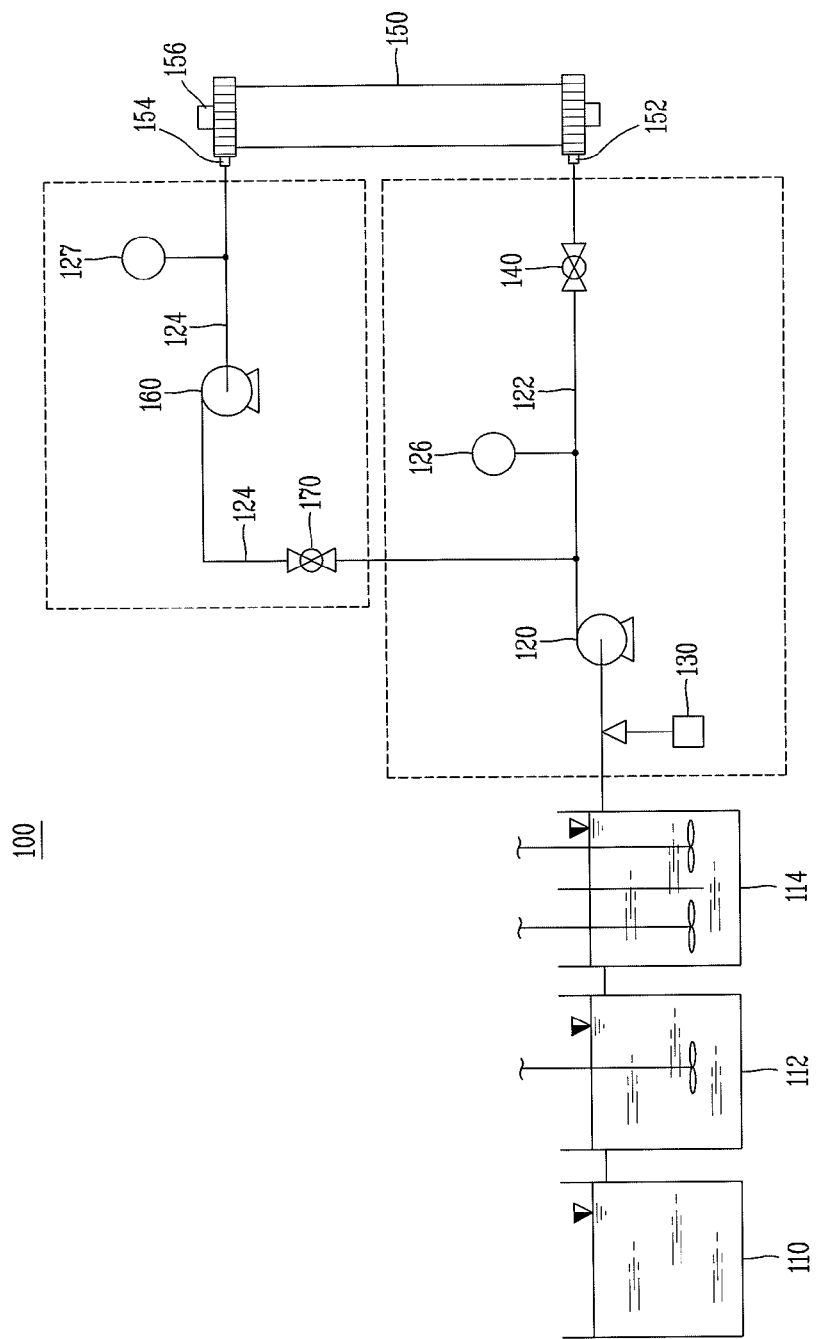
FIG. 5 is a view schematically illustrating a water treatment apparatus according to a second exemplary embodiment of the present invention.

In the foregoing exemplary embodiment, since raw water discharged from the raw water tank is directly introduced to the raw water pump and a flocculator or a settling tank are not required, a large facility space is not occupied. However, if required processing capacity is large capacity, an example of including a mixing tank, a flocculator, or a settling tank may be taken into consideration. FIG. 5 is a view illustrating a second exemplary embodiment of the present invention including a mixing tank 112 and a flocculator 114.

In the second exemplary embodiment illustrated in FIG. 5, the same reference numbers are used for the same component as those of the first exemplary embodiment, and a repeated description thereof will be omitted. Referring to FIG. 5, raw water discharged from the raw water tank 110, which is in a state in which a cohesive agent is input thereto by the cohesive agent input device 130, is introduced to and evenly mixed in a mixing tank 112, so that flocs are grown therein. Thereafter, the raw water is introduced to the raw water pump 120, is subjected to the same process as that of the first exemplary embodiment of the present invention, so as to be discharged as treatment water.

In the second exemplary embodiment, although the mixing agent and the flocculator are included, since some colloid particles or ungrown flocs are grown into flocs having an intended size on the circulation flow path 124, the volume thereof can be reduced in comparison to the case without a circulation flow path.

The foregoing exemplary embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described exemplary embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A water treatment apparatus comprising:
 a cohesive agent input device configured to input a cohesive agent to raw water;
 a membrane filtering device including:
  an inlet configured to allow raw water including the cohesive agent therein to be introduced therethrough;

a water treatment discharge opening configured to discharge treatment water to be discharged therethrough; and a raw water discharge opening configured to allow a partial amount of water which is not discharged as treatment water to be discharged therethrough;

a raw water pump configured to transfer raw water including the cohesive agent therein to the membrane filtering device;

a water supply flow path connecting a discharge side of the raw water pump to the inlet of the membrane filtering device;

a circulation flow path connecting the raw water discharge opening of the membrane filtering device to a portion of the water supply flow path downstream of the raw water pump to supply the partial amount of water which is not discharged as treatment water downstream of the raw water pump;

a positive displacement pump provided in the circulation flow path to transfer discharged raw water to the water supply flow path;

at least one baffle formed to extend from an inner wall surface of the water supply flow path, and disposed at at least one of a right angle and a slanting angle with respect to a flow direction in the water supply flow path; and a valve installed at the water supply flow path to adjust an opening degree of the water supply flow path, and disposed downstream of the raw water pump to adjust a flow rate of raw water together with the baffle.

2. The water treatment apparatus of claim 1, further comprising a flow hampering unit configured to reduce a flow rate provided in the circulation flow path.

3. The water treatment apparatus of claim 2, wherein the flow hampering unit includes at least one baffle disposed at at least one of a right angle and a slanting angle with respect to a flow direction in the circulation flow path.

4. The water treatment apparatus of claim 1, further comprising:

a contamination sensing unit configured to sense a degree of contamination of the raw water; and a control valve configured to open and close the circulation flow path such that a time during which raw water remains in the circulation flow path is controlled based on the sensed degree of contamination.

5. The water treatment apparatus of claim 4, wherein the control valve is disposed downstream of the positive displacement pump.

6. The water treatment apparatus of claim 4, further comprising:

a raw water tank configured to store raw water; and a raw water supply flow path configured to connect the raw water tank to the raw water pump, whereby raw water is directly introduced from the raw water tank to the raw water pump.

7. The water treatment apparatus of claim 6, wherein the contamination sensing unit is provided at at least one of the raw water supply flow path and the water supply flow path.

8. The water treatment apparatus of claim 1, further comprising:

a contamination sensing unit configured to sense a degree of contamination of the raw water; and a controller configured to control an operation of the positive displacement pump according to the sensed degree of contamination, wherein the controller is configured to control the positive displacement pump such that a flow rate of the discharged raw water to the circulation flow path increases as the sensed degree of contamination increases.

9. The water treatment apparatus of claim 1, wherein the cohesive agent input device is disposed upstream of the raw water pump.

10. The water treatment apparatus of claim 9, further comprising a contamination sensing unit configured to sense a degree of contamination of raw water, wherein an amount of cohesive agent input by the cohesive agent input device is determined based on the sensed degree of contamination.

11. The water treatment apparatus of claim 1, wherein the membrane filtering device includes a microfilter membrane.

12. A water treatment method of a water treatment apparatus of claim 1, the method comprising:

applying a cohesive agent to raw water;

supplying the raw water including the cohesive agent to the raw water pump;

supplying the raw water including the cohesive agent discharged from the raw water pump to the membrane filtering device;

extracting a partial amount of water which is not discharged as treatment water; and re-supplying the extracted partial amount of water to the discharge side flow path of the raw water pump.

13. The water treatment method of claim 12, further comprising sensing a degree of contamination of the water supplied to the raw water pump, wherein a time period for re-supplying the extracted partial amount of water to the discharge side flow path is determined according to the sensed degree of contamination.

14. The water treatment method of claim 12, further comprising sensing a degree of contamination of raw water supplied to the raw water pump, wherein the extracted partial amount of water is determined by the sensed degree of contamination.

15. The water treatment method of claim 12, further comprising sensing a degree of contamination of raw water supplied to the raw water pump, wherein an input amount of the cohesive agent and the extracted partial amount of water are determined according to the sensed degree of contamination.

16. The water treatment method of claim 15, wherein a flow rate of the raw water including the cohesive agent supplied to the membrane filtering device is determined according to the sensed degree of contamination.

17. The water treatment method of claim 16, wherein, when the measured recovery rate exceeds a first predetermined value, the input amount of cohesive agent and the extracted partial amount of water are decreased and, when the measured recovery rate is lower than a second predetermined value, the input amount of cohesive agent and the extracted partial amount of raw water are increased.

18. The water treatment method of claim 12, further comprising measuring a recovery rate from the membrane filtering device, wherein an input amount of the cohesive agent and the extracted partial amount of water are determined according to the measured recovery rate.

* * * * *